3,065,196
PROCESS FOR THE PRODUCTION OF VULCANISING AGENTS COMPRISING BENZOQUINONE DIOXIME PRECIPITATED ON A FILLER AND RUBBER COMPOSITION CONTAINING SAME
Paul Schneider, Opladen, and Otto Goll, Leichlingen-Metzholz, Germany, assignors to Farbenfabriken Bayer Aktiengesellschaft, Leverkusen, Germany, a corporation of Germany
No Drawing. Filed Feb. 25, 1959, Ser. No. 795,337
4 Claims. (Cl. 260—41.5)

This invention relates to a vulcanising agent and more particularly to benzoquinone dioxime and its esters. It is known for Example from United States Patent Specifications Nos. 2,393,321 and 2,519,100, that p-benzoquinone dioxime and its esters are suitable for use as vulcanisers for rubber and synthetic rubber-like polymers, and more especially for butyl rubber. However, these compounds have the disadvantage that they ignite extremely easily.

It is an object of this invention to provide an improved vulcanising agent. A further object is to provide an improved process for benzoquinone dioxime and its esters which shall be used as vulcanising agents. A still further object is to provide a benzoquinone dioxime, preferably in the form of its esters, which can be used without the danger of igniting.

As we have found benzoquinone dioxime and its esters can be uniformly deposited on particles of fillers if a solution of the benzoquinone dioxime in aqueous alkali is precipitated, if desired after the esterification thereof, in the presence of approximately 1 to 80% by weight of finely divided inert fillers.

The benzoquinone dioxime can be precipitated by known processes, and preferably by adding inorganic or organic acids, such for example as sulphuric acid, hydrochloric acid, phosphoric acid, formic acid or acetic acid. It may often be advisable to work in the presence of small quantities of wetting agents, such for example as alkyl-aryl sulphonic acids. If it is desired to precipitate esters of benzoquinone dioxime on the fillers, it is for example possible to proceed in such manner that the solution of benzoquinone dioxime in aqueous alkali is esterified in the presence of fillers, such as by reaction with the halides of aliphatic or aromatic carboxylic acids, such for example as benzoyl chloride, chlorobenzoyl chloride, toluyl bromide or nitrobenzoyl chloride.

The process of the invention can also be carried out by first of all producing the benzoquinone dioxime by methods known per se, for example by reaction of nitrosophenol with hydroxylamine, and then adding the fillers to the aqueous alkali solution. Examples of suitable alkalies are sodium hydroxide, potassium hydroxide or ammonium hydroxide which are preferably used in 1–50% solutions as a more dilute alkali solution is generally not advisable.

Examples of suitable inert fillers are kaolin, bentonite, barium sulphate, zinc oxide, kieselguhr, siliceous chalk, powdered quartz or talcum. The benzoquinone dioxime or its esters can be deposited on the inert fillers in any desired quantities, and advantageously in quantities of from 5–95% by weight. The inert fillers should be in a finely divided form, and it is expedient to use those inert fillers which pass through a 250 mesh screen. By inert fillers, there are to be more especially understood those which show no or only a slight intensifying action with respect to rubber.

In the process of the invention, the benzoquinone dioxime or its esters are precipitated onto the inert fillers in a very fine uniform distribution and the product obtained has very good properties as a vulcaniser, and is free for the disadvantage of being readily ignitable.

The following examples further illustrate the invention without limiting it thereto.

*Example 1*

246 g. of nitrosophenol are condensed together with 256 g. of 90% hydroxylamine sulphate in 5000 cc. of a 4.8% kaolin suspension, using the method indicated by R. Nietzski and A. L. Guiterman and mentioned in Berichte der deutschen chemischen Gesellschaft, vol. 21 (1888), page 429, to provide benzoquinone dioxime. A yield of 90% (about 240 g.) of benzoquinone is formed and filtered off together with the filler after adding ice, before washing with iced water and drying at 60° C. in vacuo. 478 g. of a reaction product are formed, 78% of the particles of this product passing through a 250 mesh screen. The coarse particles which do not pass through, and which amount to 22%, contain more than 80% of benzoquinone dioxime. This reaction product contains about 50% of the total of benzoquinone dioxime and is referred to hereafter as reaction product I. In contrast to this, a finely divided homogeneous coagulate is formed if 240 g. of kaolin and 2.5 g. of an alkyl-aryl sulphonate are incorporated by stirring into the solution of 240 g. of benzoquinone dioxime in 3330 cc. of 3% sodium hydroxide solution and the solution of the benzoquinone dioxime is coagulated by adding 164 g. of 70% sulphuric acid. After stirring for 3 hours, the reaction product is cooled to 5° C. with ice, filtered off, washed with iced water and dried in vacuo at 60° C. 472 g. of a finely divided powder, which has a residue of less than 0.2% on passing through a 250 mesh screen and which contains 50% of benzoquinone dioxime are formed. It is now referred to as reaction product II. In order to compare the action, as vulcanising agents of each reaction product when used on butyl rubber with that of benzoquinone dioxime, the following mixtures were prepared:

Butyl rubber _____ 100.0
Stearic acid _____ 3.0
Zinc oxide _____ 5.0
Lead dioxide _____ 4.0
Reinforcing carbon black _____ 60.0
Vulcaniser (see table).

|  | 1% benzoquinone dioxime | Vulcaniser | |
|---|---|---|---|
|  |  | 2% reaction product I | 2% reaction product II |
| Tensile strength (kg./cm.²) | 114 | 101 | 121 |
| Elongation (percent) | 415 | 520 | 390 |
| Modulus at 300% elongation (kg./cm.²) | 84 | 56 | 89 |

These results show that the activity of reaction product I used in an amount of 2%, based on the rubber, is substantially lower than corresponds to its content of benzoquinone dioxime (50%). On account of the homogeneous dispersion of the benzoquinone dioxime in reaction product II, its effectiveness is at least equivalent to that of the benzoquinone dioxime without any filler.

Corresponding results are produced if corresponding quantities of bentonite, barium sulphate, siliceous chalk, kieselguhr, powdered quartz or talcum are used instead of kaolin.

Instead of the 240 g. of the filler, it is also possible to use 1200 g. or 3800 g.

*Example 2*

To produce a finely divided quinone dioxime deposited on barium sulphate, a solution of 70 g. of benzoquinone dioxime in 600 cc. of 5% sodium hydroxide solution is added to a dispersion of 30 g. of barium sulphate in 300 cc. of 10% hydrochloric acid, the said dispersion containing 0.5 g. of the sodium salt of a hydrolysed chlorosulphonation product of a crude paraffin wax. After cooling to 5° C. the reaction mixture is filtered off and washed with ice-cold water until the filtrate is free from chloride ions. After drying at 60° C. 97 g. of a light brown mass are obtained, the quinone dioxime content of which is about 70%. A residue of only 0.2% is found when using a screen with 10,000 meshes per sq. cm.

*Example 3*

To produce a finely divided benzoquinone dioxime ester deposited on kaolin, 50 g. of benzoquinone dioxime are dissolved in 290 cc. of 10% sodium hydroxide solution at 20° C. After adding 0.5 g. of sodium alkylaryl sulphonate, the mixture is diluted with 1000 cc. of water, and 125 g. of kaolin are added in small portions. 105 g. of benzoyl chloride are then run into the suspension over a period of 2 hours while stirring, and thereafter the mixture is heated for 30 minutes at 40° C. The reaction mixture is then cooled with ice to 5° C. and filtered. The residue is first of all washed with ice-cold water, then with dilute, sodium carbonate solution and finally with water until the filtrate is free from chlorine ions. After drying at 60° C. 242 g. of a light brown reaction product containing about 50% of the dibenzoate of benzoquinone dioxime (reaction product III), of which the residue not passing through a 250 mesh screen is 0.4% are obtained.

In order to determine its efficiency as a vulcaniser for butyl rubber, the following mixture was prepared:

| | G. |
|---|---|
| Butyl rubber | 100.0 |
| Zinc oxide | 5.0 |
| Stearic acid | 3.0 |
| Reinforcing carbon black | 60.0 |
| Lead dioxide | 10.0 |
| Vulcaniser (see table). | |

Samples of the mixture were vulcanised for 40 minutes at 143° C. and the following test values were determined from the vulcanisates.

| | Vulcaniser | |
|---|---|---|
| | 6% benzoquinone dioxime dibenzoate | 12% reaction product III |
| Strength (kg./cm.²) | 132 | 128 |
| Elongation (percent) | 420 | 430 |
| Modulus at 300% elongation (kg./cm.²) | 84 | 86 |

Instead of benzoyl chloride, it is also possible to use equivalent quantities of 3-chlorobenzoyl chloride, o-toluyl bromide or 3-nitrobenzoyl chloride.

*Example 4*

A benzoquinone dioxime deposited on siliceous chalk is prepared as follows:

30 g. of benzoquinone dioxime are dissolved in 625 cc. of 2% sodium hydroxide solution. At the same time, 0.5 g. of sodium alkylaryl sulphonate and 70 g. of siliceous chalk are added to the solution. By adding 120 cc. of 10% hydrochloric acid, the benzoquinone dioxime is precipitated from its solution and worked up as indicated in Example 1. After drying, 98 g. of a light yellowish brown reaction product are obtained, the benzoquinone dioxime content of which is about 30%, and which gives a residue of 0.1% when using a 250 mesh screen.

Instead of 625 cc. of 2% sodium hydroxide solution, it is also possible to use 32 cc. of 50% sodium hydroxide solution.

We claim:
1. A process for the production of vulcanising agents, which comprises precipitating a member selected from the group consisting of benzoquinone dioxime and its esters from an aqueous alkaline medium upon approximately 1 to 80% by weight of finely divided inert fillers.
2. Vulcanising agents obtained according to claim 1.
3. A process for the production of a vulcanizing agent which comprises adding an acid to an alkaline solution of benzoquinone dioxime in the presence of approximately 1–80% by weight of a finely divided inert filler, whereupon the benzoquinone dioxime is precipitated on the surface of said finely divided filler.
4. A rubber composition which employs as a vulcanising agent an inert filler having distributed thereon a precipitated coating prepared by precipitating a member selected from the group consisting of benzoquinone dioxime and its esters from an aqueous alkaline medium in the presence of approximately 1–80% by weight of said inert filler in finely divided form.

References Cited in the file of this patent
UNITED STATES PATENTS

| 1,993,971 | MacQueen | Mar. 12, 1935 |
| 2,139,995 | Breyer et al. | Dec. 13, 1938 |
| 2,446,165 | Trepagnier | Aug. 3, 1948 |
| 2,524,977 | Holbrook et al. | Oct. 10, 1950 |

OTHER REFERENCES

Nietzski et al.: "Berichte der Deutschen Chemischen Gesselschaft," volume 21 (1888), page 429.